US011835949B2

(12) United States Patent
Nielsen (10) Patent No.: US 11,835,949 B2
(45) Date of Patent: Dec. 5, 2023

(54) AUTONOMOUS DEVICE SAFETY SYSTEM

(71) Applicant: Mobile Industrial Robots A/S, Odense SØ (DK)

(72) Inventor: Søren E. Nielsen, Odense SOE (DK)

(73) Assignee: MOBILE INDUSTRIAL ROBOTS A/S, Odense Soe (DK)

( * ) Notice: Subject to any disclaimer, the term of this patent is extended or adjusted under 35 U.S.C. 154(b) by 0 days.

(21) Appl. No.: 17/102,999

(22) Filed: Nov. 24, 2020

(65) Prior Publication Data

US 2022/0163965 A1    May 26, 2022

(51) Int. Cl.
| | |
|---|---|
| G05D 1/00 | (2006.01) |
| G05D 1/10 | (2006.01) |
| B60Q 5/00 | (2006.01) |
| G05D 1/02 | (2020.01) |
| H04W 84/04 | (2009.01) |

(52) U.S. Cl.
CPC ........... G05D 1/0088 (2013.01); B60Q 5/006 (2013.01); G05D 1/0214 (2013.01); G05D 1/0223 (2013.01); G05D 1/0276 (2013.01); G05D 1/106 (2019.05); *G05D 1/0231* (2013.01); *H04W 84/042* (2013.01)

(58) Field of Classification Search
CPC .. G05D 1/0088; G05D 1/0214; G05D 1/0223; G05D 1/0276; G05D 1/106; G05D 1/0231; G05D 1/024; G05D 1/028; G05D 1/0289; G05D 1/0297; G05D 1/0248; G05D 2201/0216; G01C 21/206; B60Q 5/006; H04W 84/042
See application file for complete search history.

(56) References Cited

U.S. PATENT DOCUMENTS

| | | |
|---|---|---|
| 5,983,161 A | 11/1999 | Lemelson et al. |
| 7,196,487 B2 | 3/2007 | Jones et al. |
| 9,110,470 B2 | 8/2015 | Karlsson et al. |
| 9,402,151 B2 | 7/2016 | Sona et al. |
| 9,415,310 B2 | 8/2016 | Martini |
| 9,440,354 B2 | 9/2016 | Gutmann et al. |
| 9,602,974 B2 | 3/2017 | Rudow et al. |
| 9,606,544 B2 | 3/2017 | Gariepy et al. |

(Continued)

FOREIGN PATENT DOCUMENTS

| | | |
|---|---|---|
| CA | 2416382 C | 2/2006 |
| WO | 2016057140 A1 | 4/2016 |
| WO | 2016165721 A1 | 10/2016 |

OTHER PUBLICATIONS

International Search Report for International Patent Application No. PCT/EP2021/082039, dated Apr. 5, 2022, (5 pages).

(Continued)

*Primary Examiner* — Anne Marie Antonucci
*Assistant Examiner* — Connor L Knight
(74) *Attorney, Agent, or Firm* — Burns & Levinson LLP (57) ABSTRACT

An example system includes a positioning surveillance system (PSS) to identify locations of objects that are movable throughout a space. The PSS is configured to identify the locations without requiring a line-of-sight between the objects. A control system is configured to determine distances based on the locations of the objects in the space and to communicate information to the objects that is based on the distances. The information is usable by the objects for collision avoidance.

42 Claims, 5 Drawing Sheets

(56) References Cited

U.S. PATENT DOCUMENTS

| | | | |
|---|---|---|---|
| 9,663,025 | B2 | 5/2017 | Drexler et al. |
| 9,891,630 | B2 | 2/2018 | Gariepy et al. |
| 9,910,158 | B2 | 3/2018 | Rudow et al. |
| 9,918,605 | B2 | 3/2018 | Wolfe et al. |
| 10,028,632 | B2 | 7/2018 | Britain et al. |
| 10,133,276 | B1* | 11/2018 | Shydo, Jr. ............ G05D 1/0223 |
| 11,169,539 | B2* | 11/2021 | Kwak ................... G05D 1/0242 |
| 11,287,824 | B2 | 3/2022 | Jacobsen |
| 11,377,120 | B1* | 7/2022 | Deng ................ B60W 30/0956 |
| 2004/0158354 | A1 | 8/2004 | Lee et al. |
| 2005/0182518 | A1 | 8/2005 | Karlsson |
| 2007/0027612 | A1 | 1/2007 | Barfoot et al. |
| 2007/0222674 | A1 | 9/2007 | Tan et al. |
| 2009/0313370 | A1 | 12/2009 | Rhoads |
| 2012/0121161 | A1 | 5/2012 | Eade et al. |
| 2012/0146850 | A1* | 6/2012 | Liu .......................... G01S 19/34 342/357.42 |
| 2012/0244879 | A1* | 9/2012 | Freathy ................. H04W 4/029 455/456.1 |
| 2013/0029686 | A1 | 1/2013 | Moshfeghi |
| 2013/0297195 | A1 | 11/2013 | Das et al. |
| 2014/0035732 | A1* | 2/2014 | Karr ................... G06K 19/0726 340/10.5 |
| 2014/0110183 | A1 | 4/2014 | Rudakevych et al. |
| 2014/0129027 | A1 | 5/2014 | Schnittman |
| 2015/0133173 | A1 | 5/2015 | Edge et al. |
| 2015/0329043 | A1 | 11/2015 | Skvarce |
| 2016/0075024 | A1 | 3/2016 | Ozick |
| 2016/0140851 | A1* | 5/2016 | Levy .................... G08G 5/0034 701/410 |
| 2016/0229058 | A1 | 8/2016 | Pinter et al. |
| 2016/0349362 | A1 | 12/2016 | Rohr et al. |
| 2016/0353238 | A1 | 12/2016 | Gherardi et al. |
| 2017/0031366 | A1 | 2/2017 | Shamlian et al. |
| 2017/0038776 | A1 | 2/2017 | Gariepy et al. |
| 2017/0080850 | A1 | 3/2017 | Drexler et al. |
| 2017/0102701 | A1 | 4/2017 | Pack et al. |
| 2017/0120906 | A1 | 5/2017 | Penilla et al. |
| 2017/0147003 | A1 | 5/2017 | Karlsson |
| 2017/0197643 | A1 | 7/2017 | Gariepy et al. |
| 2017/0232885 | A1 | 8/2017 | Drexler et al. |
| 2017/0276501 | A1 | 9/2017 | Wise et al. |
| 2017/0300061 | A1 | 10/2017 | Hickerson et al. |
| 2017/0329332 | A1 | 11/2017 | Pilarski et al. |
| 2017/0337820 | A1* | 11/2017 | Glatfelter ................ G08G 1/164 |
| 2018/0032078 | A1 | 2/2018 | Ferguson et al. |
| 2018/0113200 | A1 | 4/2018 | Steinberg et al. |
| 2018/0143312 | A1* | 5/2018 | High ........................ H04W 4/33 |
| 2018/0169863 | A1 | 6/2018 | Bushman et al. |
| 2018/0253093 | A1 | 9/2018 | Augugliaro et al. |
| 2018/0253107 | A1 | 9/2018 | La et al. |
| 2018/0284792 | A1 | 10/2018 | Kleiner et al. |
| 2019/0033866 | A1 | 1/2019 | Pack et al. |
| 2019/0043361 | A1 | 2/2019 | Freeman et al. |
| 2019/0088136 | A1* | 3/2019 | Nagata .................... G08G 1/163 |
| 2019/0171215 | A1* | 6/2019 | Tatourian ............. G05D 1/0246 |
| 2019/0384314 | A1 | 12/2019 | Jacobsen |
| 2020/0004247 | A1 | 1/2020 | Jacobsen |
| 2020/0023836 | A1* | 1/2020 | Schneider ........... B60W 30/095 |
| 2020/0219197 | A1 | 7/2020 | Fields et al. |
| 2020/0302093 | A1* | 9/2020 | Wodrich ............... G01S 5/0264 |
| 2020/0346628 | A1* | 11/2020 | Whitfield, Jr. ............ B60T 8/17 |
| 2022/0134986 | A1* | 5/2022 | Partow-Navid ........ B60Q 9/008 340/436 |

OTHER PUBLICATIONS

Written Opinion for International Patent Application No. PCT/EP2021/082039, dated Apr. 5, 2022, (10 pages).

Claes, D., Tuyls, K. Multi robot collision avoidance in a shared workspace. Auton Robot 42, 1749-1770 (2018), (22 pages), retrieved from: https://doi.org/10.1007/s10514-018-9726-5.

Muhammad Zohaib et al., "Control Strategies for Mobile Robot With Obstacle Avoidance", in Journal of Basic and Applied Scientific Research (JBASR), 2013, Issue 3, vol. 4, pp. 1027-1036, (11 pages).

Blizzard, Classic games, Warcraft: Orcs & Humans (1994). [Online]. Available: http://us.blizzard.com/en-us/games/legacy. [Last accessed Dec. 26, 2017].

Dixon, J., and Henlich, 0., Mobile Robot Navigation, Final Report, Imperial College, London, 27 pages (Jun. 10, 1997). [Online]. Available: https://www.doc.ic.ac.uk/~nd/surprise 97/journal/vol4/jmd/. [Accessed Jun. 22, 2017].

Dos Gamers Archive, Warcraft II: Tides of Darkness, 1 page (1995). [Retrieved Online Aug. 15, 20181. Available: http://imaae.dosaamesarchive.com/screenshots/war2 06.ona.

Expomondo, EXPO 2000, Themenpark & AuBengelande, Deutsch land, Holtmann International, (2000). [Online]. Available: http://expomondo.it/exoo.html.

ferzkopp.net, 2000. [Retrieved Online Aug. 15, 2018]. Available: http://www.ferzkopp.net/MediaAndArt/Expo2000/Softwaremodule.qif.

Nedelea, A., Hyundai's Future Augmented Reality Looks Pretty Cool, 6 pages (Jan. 1, 2015). [Retrieved Online Aug. 15, 2018]. Available: https://www. cars coo os. com/201 5/01 /hvu nd ais-futu re-a ua mented-rea litv-loo ks/.

Roger Russell, "roger-russell.com," 2004. [Online]. Available: https://web.archive.org/web/20050404140115/http://www.roger-russell.com/project/project.htm. [Retrieved Aug. 20, 2018].

Shenton, Collectable Clocks, Illustration 306, Projection Clock/Night Clock (1909). [Online]. Available: https://web.archive.org/web/20041012014240/http://www.mueller-maerki.com:80/h-niteclk.html. [Retrieved Aug. 20, 20181.

United States Patent and Trademark Office, U.S. Appl. No. 14/883,698 Notice of Allowance and Fee(s) due, 7 pages (dated Nov. 29, 2011).

Zentrum fur Kunst und Medientechnologie (ZKM), Knowledge, Information, Communication Swarming with robots, EXPO 2000 HANNOVER GmbH (2000). [Online]. Available: http://site.expo2000.de/expo2000/englisch/themenpark/frame wissen e.html.

International Search Report for PCT/EP2019/067661, 6 pages (dated Nov. 18, 2019).

Written Opinion for PCT/EP2019/067661, 10 pages (dated Nov. 18, 2019).

International Preliminary Report on Patentability for PCT Application No. PCT/EP2019/081349, dated Jun. 3, 2021, (12 pages).

Borenstein, J. et al., Mobile Robots Positioning: Sensors and Techniques, Journal of Robotic Systems, 14(4): 231-249 (1997).

Goel, P. et al., Robot Localization Using Relative and Absolute Position Estimates, In Proc. Int. Conf. intelligent Robots and Systems, IROS '99, 7 pages (1999).

Mobile Industrial Robots, MiRFleet, Reference Guide, v.1.0, 32 pages (Jan. 2017).

Paya, L. et al., A State-of-the-Art Review on Mapping and Localization of Mobile Robots Using Omnidirectional Vision Sensors, Journal of Sensors, vol. 2017, Article ID 3497650, 20 pages (Published Apr. 24, 2017). URL: https://www.hindawi.com/journals/js/2017/3497650/ [Retrieved Nov. 19, 2018].

Jan Rohde, "Vehicle localization with enhanced robustness for urban automated driving", Jan. 18, 2018, pp. 1-177. Karlsruhe, Germany. DOI: 10.5445/IR/1000080454. Retrieved from the Internet: URL:http://dx.doi.org/10.5445/IR/1000080454.

Johann Borenstein et al.: "Where am I? Sensors and Methods for Mobile Robot Positioning", Apr. 22, 1996 (Apr. 22, 1996), pp. 1-182, XP055600238, Retrieved from the Internet: URL:http://wwwpersonal.umich.eduhjohannb/Papers/pos96rep.pdf [retrieved on Jun. 27, 2019].

Stella E. et al.: "Mobile robot navigation using vision and odometry", Proceedings of the Intelligent Vehicles Symposium, XX, Oct. 24, 1994 (Oct. 24, 1994), pp. 417-422, XP002697677, DOI: 10.1109/IVS.1994.639554.

MIR 500 User Guide. Mobile Industrial Robots A/S. Odense, S0. (Sep. 2019). V 1 3, (pp. 1-100). 100 pages.

MIR 100 User Guide, Mobile Industrial Robots A/S. Odense, S0. (Aug. 2018). V. 1.1, (pp. 1-42). 44 pages.

MIR 100 User Guide, Mobile Industrial Robots A/S. Odense, S0. (Nov. 2017). V. 1.0, (pp. 1-37). 39 pages.

(56) References Cited

OTHER PUBLICATIONS

International Preliminary Report on Patentability in Application No. PCT/EP2021/082039 dated May 30, 2023, 9 pages.
International Search Report and Written opinion in Application No. PCT/EP2021/082039 dated Apr. 5, 2022, 12 pages.

* cited by examiner

AUTONOMOUS DEVICE SAFETY SYSTEM

TECHNICAL FIELD

This specification relates generally to systems that use distances between autonomous devices to control operation of the devices

BACKGROUND

Autonomous devices, such as mobile robots, are configured to travel within a space, such as a warehouse, independently. During travel, there is a risk that an autonomous device will collide with other movable objects in the space. This risk may increase as the speeds of the movable objects increase.

SUMMARY

An example system includes a positioning surveillance system (PSS) to identify locations of objects that are movable throughout a space. The PSS is configured to identify the locations without requiring a line-of-sight between the objects. A control system is configured to determine distances based on the locations of the objects in the space and to communicate information to the objects that is based on the distances. The information is usable by the objects for collision avoidance. The system may include one or more of the following features, either alone or in combination.

The PSS may include at least two transceivers arranged throughout the space, each of which may be configured to determine location information for each of the objects. The PSS may be configured to identify the locations of the objects using a triangulation process based on the location information from the at least two transceivers. The PSS may include at least one transceiver on at least one autonomous vehicle that is movable within the space. The autonomous vehicle may include one of the objects that are movable throughout the space.

Each of the objects may be associated with a tag. The PSS may be configured to output signals to the tags and to identify the locations based on a triangulation process using reflections of the signals from the tags. A round-trip time from signal output to receipt of tag signal reflection may be within a range of 1 microsecond (μs) to 20 milliseconds (ms). The signals may be output at speeds that are available through the fifth generation (5G) technology standard for broadband cellular networks. The signals may have reliabilities and latencies that are associated with the fifth generation (5G) technology standard for broadband cellular networks.

The system may be stationary within the space. The distances may include a distance between two of the objects. The distances may include a distance between each of two of the objects and a specified point in the space. The information may include the distances. The information may include risk levels based on the distances, where a risk level includes one of predefined risk levels. Risk levels that represent greater risks may correspond to shorter distances between objects.

The information may include first information. The PSS may be configured to identify when a location of an object is no longer identifiable. The control system may be configured to communicate second information to the objects based on the location of the object no longer being identifiable. Risk levels may be based on the first information, where a risk level corresponds to a risk of collision between at least two of the objects, and where risk levels that represent greater risks correspond to shorter distances between objects and risk levels that represent less risk correspond to longer distances between objects. The second information may correspond to a greatest level of risk among the risk levels.

The objects may include one or more of autonomous vehicles, manually-operated vehicles, or living beings. The PSS may be configured to identify the locations periodically or intermittently. The control system may be configured to determine the distances periodically or intermittently and to communicate the information to the objects periodically or intermittently. The information may correspond to risk levels that are based also on absolute speed of at least one of the objects. The information may correspond to risk levels that are based also an approach speed, where the approach speed includes a relative speed of two of the objects.

An example system includes a centralized system configured to manage autonomous vehicles that are operable within a space. The centralized system is configured to identify locations of movable objects including an autonomous vehicle in the space absent line-of-sight between the objects and to output information to the objects based on the locations. The autonomous vehicle includes an on-board computing system to implement a course of action based on the information. The example system may include one or more of the following features.

The on-board computing system may be configured to implement a course of action based also on attributes of the autonomous vehicle. The attributes may include at least one of a size of the autonomous vehicle, a weight of the autonomous vehicle, a maximum speed of the autonomous vehicle, or braking distances of the autonomous vehicle at different speeds. The course of action may include changing a speed of travel of the autonomous vehicle.

The information output by the centralized system may include distances between the objects or between the objects and a predefined location in the space that are based on the locations. The information may include risk levels based on distances between the objects or between the objects and a predefined location in the space that are based on the locations, where a risk level includes one of predefined risk levels. The on-board computing system may generate a warning based on the risk level, the warning may be at least one of audible or visual.

The information may include risk levels, where a risk level is one of predefined risk levels. For a risk level that represents greater risk of collision of the autonomous vehicle, the course of action may include reducing a speed of travel of the autonomous vehicle. For a risk level that represents less risk of collision of the autonomous vehicle, the course of action may include increasing or maintaining a speed of travel of the autonomous vehicle. For a risk level that represents less risk of collision of the autonomous vehicle, the course of action may include reducing a size of a safety zone associated with the autonomous device. Each of the objects including the autonomous vehicle may have a tag that is indicative of presence in the space. In a case that the centralized system is unable to establish the presence of an object in the space using the tag, the course of action may include decreasing speed of the object, stopping the object, or acting on a warning.

The centralized system may include at least two static transceivers arranged in the space. Each of the transceivers may be configured to determine location information for each of the objects. The centralized system may be configured to identify the locations of the objects using a triangulation process based on the location information from the transceivers. The centralized system may include at least one transceiver on at least one autonomous vehicle that is movable within the space. Each of the objects may be associated with a tag. The centralized system may be configured to output signals to the tags and to identify the locations based on a triangulation process using reflections of signals from the tags. A round-trip time from signal output to receipt of tag signal reflection may be within a range of 1 microsecond (µs) to 1 millisecond (ms). A round-trip time from signal output to receipt of tag signal reflection may be within a range of 1 microsecond (µs) to 20 milliseconds (ms). The signals may be output at speeds that are available through the fifth generation (5G) technology standard for broadband cellular networks. The signals may have reliabilities and latencies that are associated with the fifth generation (5G) technology standard for broadband cellular networks.

At least one of the autonomous vehicles may include a flight-capable drone. The space may include air space through which the drone can fly.

Any two or more of the features described in this specification, including in this summary section, can be combined to form implementations not specifically described herein.

The systems, techniques, devices, and processes described herein, or portions thereof, can be implemented as and/or controlled by a computer program product that includes instructions that are stored on one or more non-transitory machine-readable storage media, and that are executable on one or more processing devices to control (e.g., to coordinate) the operations described herein. The systems, techniques, devices, and processes described herein, or portions thereof, can be implemented as an apparatus, method, or electronic system that can include one or more processing devices and memory to store executable instructions to implement various operations. The systems, techniques, processes, devices, and/or components described herein may be configured, for example, through design, construction, arrangement, placement, programming, operation, activation, deactivation, and/or control.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are examples of autonomous devices or vehicles, such as a mobile robot, that are configured to move within a space, such as a warehouse or factory. An example autonomous device (or "device") is configured to move along a surface, such as the floor of a warehouse. The device includes a body for supporting the weight of an object and wheels on the body to enable the body to traverse the surface. The example device includes sensors on the body configured for detecting objects in a field-of-view (FOV) or simply "field". The sensors on the device may be line-of-sight, which means that they detect objects within their FOV. Objects that are outside the FOV or that are obstructed, may not be detectable using those sensors.

Accordingly, the example systems described herein include a positioning surveillance system (PSS). In an example, the PSS is a centralized system configured to manage devices that are operable within a space. The PSS is configured to identify locations of movable objects including an autonomous device in the space absent line-of-sight between those objects, to determine distances based on the locations of the objects in the space, and to output information to the objects based on the locations. For example, the distances may be between two objects in the same vicinity or between those two objects and a common reference point in the space. The information that is output may include, for example, the distances determined, one or more risk levels based on the distances determined, or both the distances and the risk levels. In this regard, risk levels correspond the likelihood or risk of collision between two objects, where risk levels that represent greater risks correspond to shorter distances between objects or between objects and a common reference point. For example, the closer two movable objects are to each other, the greater the likelihood is of a collision between those two objects. The likelihood of collision between the two objects may increase with an increase in the speed of movement of one or both of the objects. Conversely, the likelihood of collision between the two objects may decrease with a decrease in the speed of movement of one or both of the objects.

In response to receipt of the information from the PSS, an object such as an autonomous device is configured to implement a course of action based on the information. In some implementations, the course of action may include changing a speed of travel of the autonomous device or stopping movement of the object altogether. The course of action may be based also on attributes of the autonomous device such as, but not limited to a size of the autonomous device, a weight of the autonomous device, a maximum speed of the autonomous device, or braking distances of the autonomous device at different speeds. For example, the speeds of larger devices may need to be decreased more than the speeds of smaller devices since the larger devices gain more momentum at the same speeds, which can make them difficult to stop or slow-down in order to avoid a collision with another object.

Communications between the PSS and objects in the space, including autonomous devices, may be implemented at speeds that are available through the fifth generation (5G) technology standard for broadband cellular networks, and with the reliability that is inherent in such 5G cellular technologies. In this regard, a speed of a 5G wireless network may be measured by its bitrate or network bandwidth. Network bandwidth corresponds to the maximum rate of data transfer over the 5G cellular network. Bitrate is the transfer of data defined in bits-per-second (bps). Speeds such as this allow the PSS to communicate with objects with greater frequency, enabling risk levels to be updated in shorter periods. That is, since more data can be transmitted in a shorter time frame, communications between the PSS and objects such as an autonomous device can occur with greater frequency and with 5G reliability. In an example, a risk level can be updated in single-digit milliseconds (ms) or less. In a particular example, a risk level can be updated every 20 ms. Communications using 5G cellular technologies allows the PSS to update the risk levels frequently, thereby enabling objects, such as autonomous devices in the space to adjust rapidly to changing conditions. Furthermore, in implementations that use 5G cellular signals, the PSS functionality may be implemented centrally without having or requiring line-of-sight to the objects in the space. For example, line-of-sight is not required between objects in the space or between the PSS and the objects.

In an example operation, two autonomous devices may be approaching each other, but out of each other's line-of-sight. For example, the two devices may both be approaching an intersection from different routes. Walls or other obstructions may prevent one device from seeing the other device. The PSS may increase the risk level of each device as they draw closer to each other or closer to the intersection. The devices therefore decrease in speed in accordance with their increased risk levels. At some point, the devices will be within each other's line-of-sight, which may enable a vision-based collision avoidance system to change the trajectories of the objects to prevent a collision. At that time, however, the devices will be operating at decreased speeds, giving the collision avoidance system time to control operation of the devices to avoid collision. For example, the devices may be operating at a speed that enables stopping within a short distance of each other. Had the devices not already decreased in speed, the devices may not be able to stop in time to avoid a collision even if instructed to do so by the collision avoidance system. When the risk level is or becomes low, and there is little risk of collision with other objects, the devices may increase their speed of travel or maintain their current speed of travel. Thus, when not in danger of collision, the PSS enables the devices to travel at greater speeds.

Each autonomous device may also include a control system. The control system may include of one or more processing devices, such as one or more microprocessors, that are on-board the autonomous device and/or remote from the autonomous device, as described below. In some implementations, the control system may be predominantly remote from the autonomous device, with the autonomous device having limited processing capability. This may be achieved using the 5G communications described herein. The PSS may be a part of the remote control system.

Figure 1:
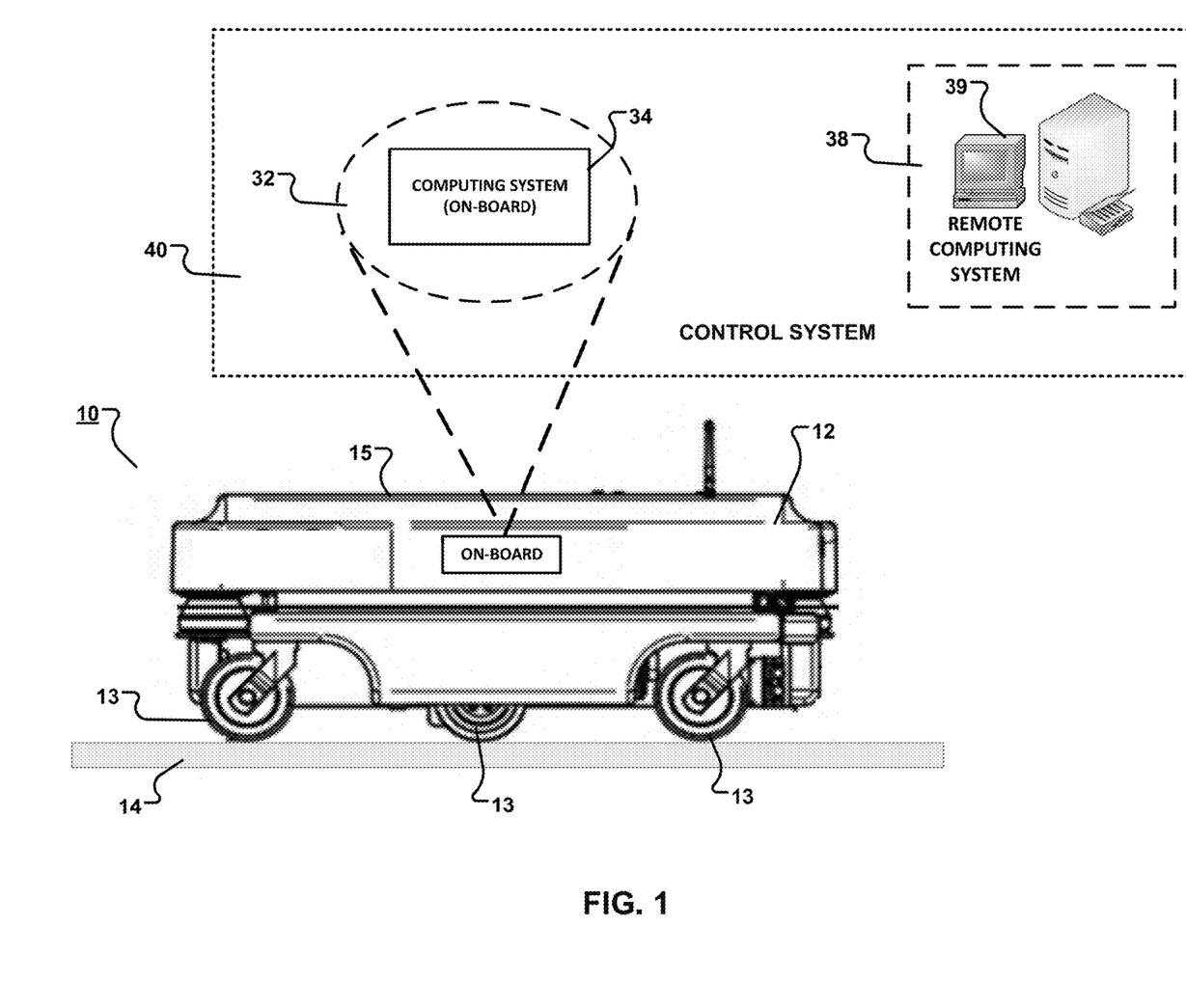
FIG. 1 is a side view of an example autonomous device.

An example of an autonomous device is autonomous robot 10 of FIG. 1. In this example, autonomous robot 10 is a mobile robot and is referred to simply as "robot". Robot 10 includes a body 12 having wheels 13 to enable robot 10 to travel across a surface 14, such as the floor of a warehouse, a factory, or other terrain. Robot 10 includes a support area 15 configured to support the weight of an object. In this example, robot 10 may be controlled to transport the object from one location to another location. Robot 10 includes various sensors for use in detecting the robot's location.

In this example, robot 10 includes two types of long-range sensors: a three-dimensional (3D) camera and a light detection and ranging (LIDAR) scanner. These sensors are line-of-sight sensors in that they require visibility of an object for detection. The robot, however, is not limited to this configuration or these sensors. For example, the robot may include a single long-range sensor or a single type of long-range sensor. For example, the robot may include more than two types of long-range sensors.

Figure 2:
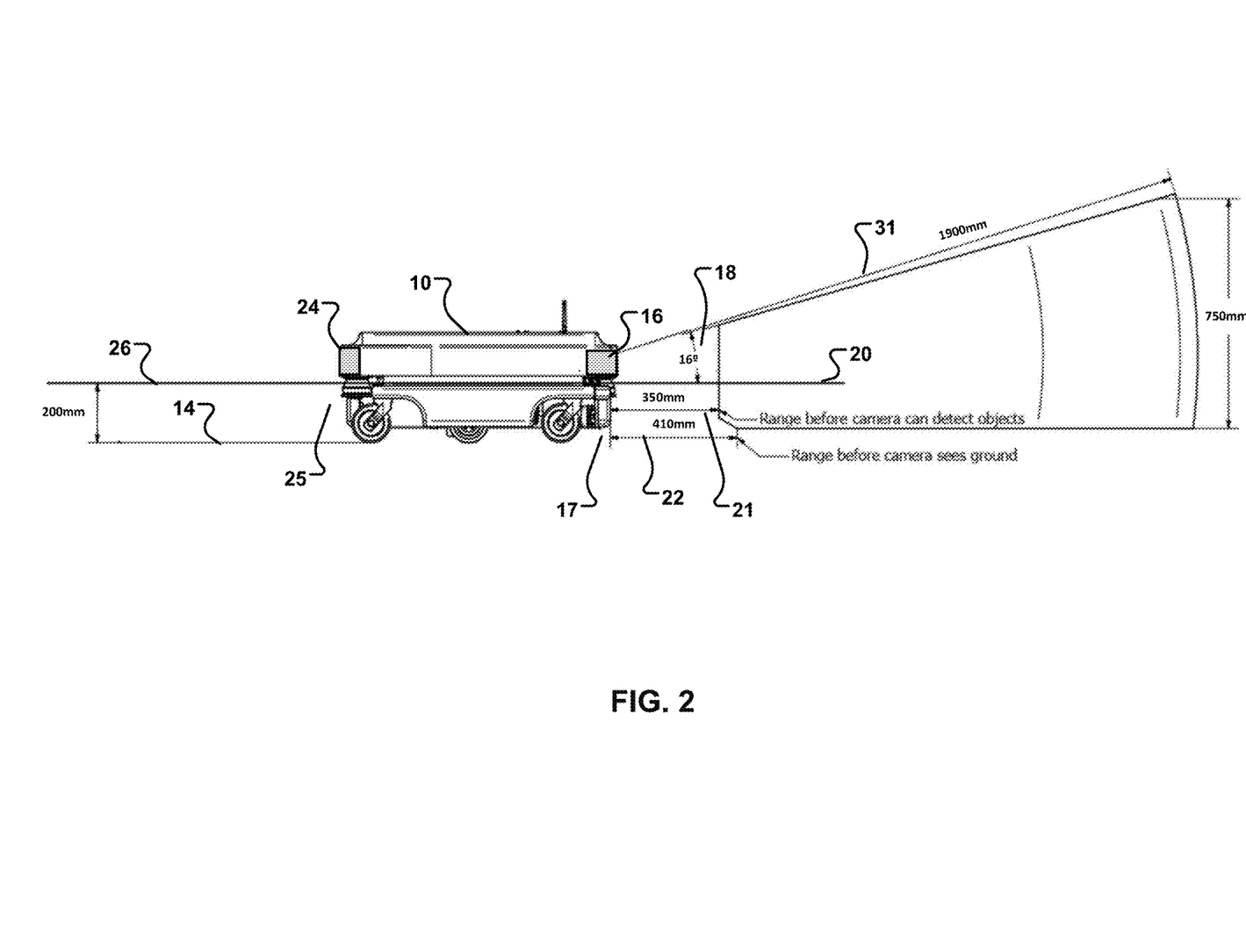
FIG. 2 is a side view of the example autonomous device, which shows ranges of long-range sensors included on the device.

Referring to FIG. 2, robot 10 includes 3D camera 16 at a front 17 of the robot. In this example, the front of the robot faces the direction of travel of the robot. The back of the robot faces terrain that the robot has already traversed. In this example, 3D camera 16 has a FOV 18 of 16° off of horizontal plane 20. The placement of 3D camera 16 is such that there is about a 350 millimeter (mm) range 21 before the 3D camera can detect an object proximate to the robot, and about a 410 mm range 22 before the object can detect the surface 14 on which it is traveling. In this example, the 3D camera has a sensing range 31 of about 1900 mm and can see about 750 mm above surface 14. Robot 10 also includes a LIDAR scanner 24 at its back 25. In this example, the LIDAR scanner is arranged at a back corner of the robot. The LIDAR scanner is configured to detect objects within a sensing plane 26. In this example, the sensing plane is about 200 mm above surface 14. The LIDAR scanner may not detect objects less than 200 mm above surface 14. A similar LIDAR scanner is included at the diagonally opposite front corner of the robot, which has the same scanning range and limitations.

Figure 3:
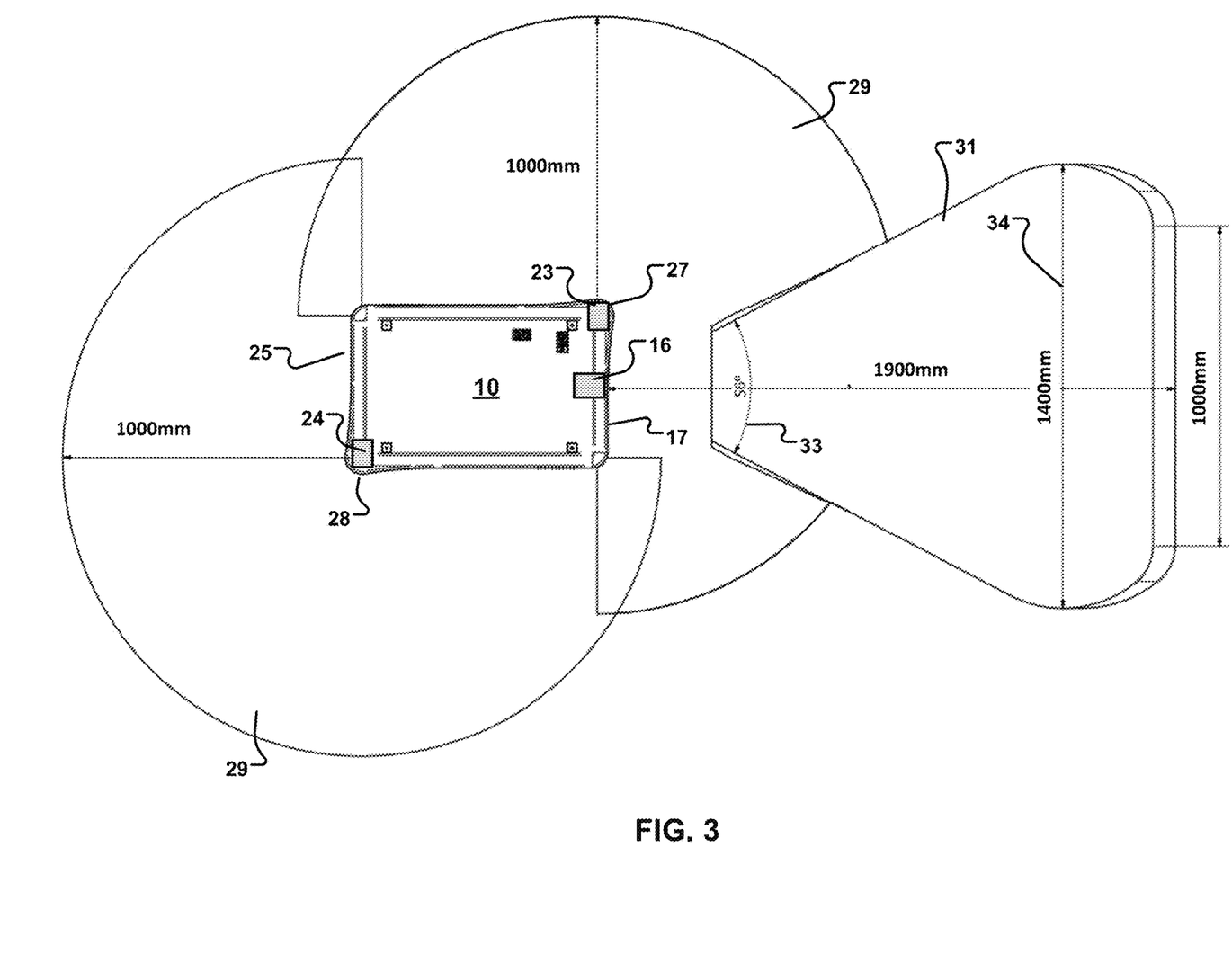
FIG. 3 is a top view of the example autonomous device, which shows ranges of the long-range sensors included on the device.

FIG. 3 is a top view of robot 10. LIDAR scanners 24 and 23 are located at back corner 28 and at front corner 27, respectively. In this example, each LIDAR scanner has a scanning range 29 of about 1000 mm over an arc of about 270°. In some implementations, each LIDAR scanner may have a scanning range of about 1200 mm over an arc of about 270°. In this example, a range 31 of 3D camera 16 is about 1900 mm over an arc 33 of about 56°. However, after a plane 34, the field of view of 3D camera 16 decreases from about 1400 mm to about 1100 mm at the maximum range of the 3D camera. In some implementations, short-range sensors are incorporated into the robot to sense in the areas that cannot be sensed by the long-range sensors. The short-range sensors may be arranged at corners of the robot or around a circumference of the robot. Examples of short-range sensors include, but are not limited to, time-of-flight (ToF) laser-ranging modules, an example of which is the VL53L0X manufactured by STMicroelectronics®, and infrared sensors.

One or more of the sensors may be configured to continuously detect distances between the robot and visible objects in a vicinity of the robot. This may be done in order to avoid collision and to guide the robot safely around or between visible objects along a route. For example, while the robot is moving along a route, an on-board computing system may continuously receive input from the sensors. If an obstacle within the line-of-sight of the sensors is blocking the trajectory of the robot, the on-board computing system may plan a path around the obstacle. If an obstacle within the line-of-sight of the sensors is predicted to block the trajectory of the robot, the on-board computing system may plan a path around the obstacle. In some implementation, an on-board controller or control system sends information to a remote computing system and the remote computing system may instruct the robot on where to move to avoid a collision. This type of remote control may be implemented, for example, using signals that have 5G speeds and reliabilities, examples of which are described herein. In the example of FIG. 1, control system 40 includes on-board components 32 and remote components 38, which are described in more detail below.

The LIDAR scanner, the 3D camera, and/or any short-range sensors constitute a vision system for the robot. In some implementations, the vision system is line-of-sight in that the vision system requires on object to be visible in order to be detected. In some implementations, the control system 40 stores, in computer memory, a map of a space in which the robot travels. The map may be located on the robot or at any location remote from the robot that is accessible to the control system. The map includes locations of landmarks, such as columns, corners, windows, poles, and other distinguishable features of the space that act as references for the robot. The map also may also include measurements indicating the size of the space, measurements indicating the size and locations of the landmarks, measurements indicating distances between landmarks, and coordinate information identifying where the landmarks are located in the space. The control system may use visual data from the vision system and data from the map to navigate throughout the space during operation.

Figure 4:
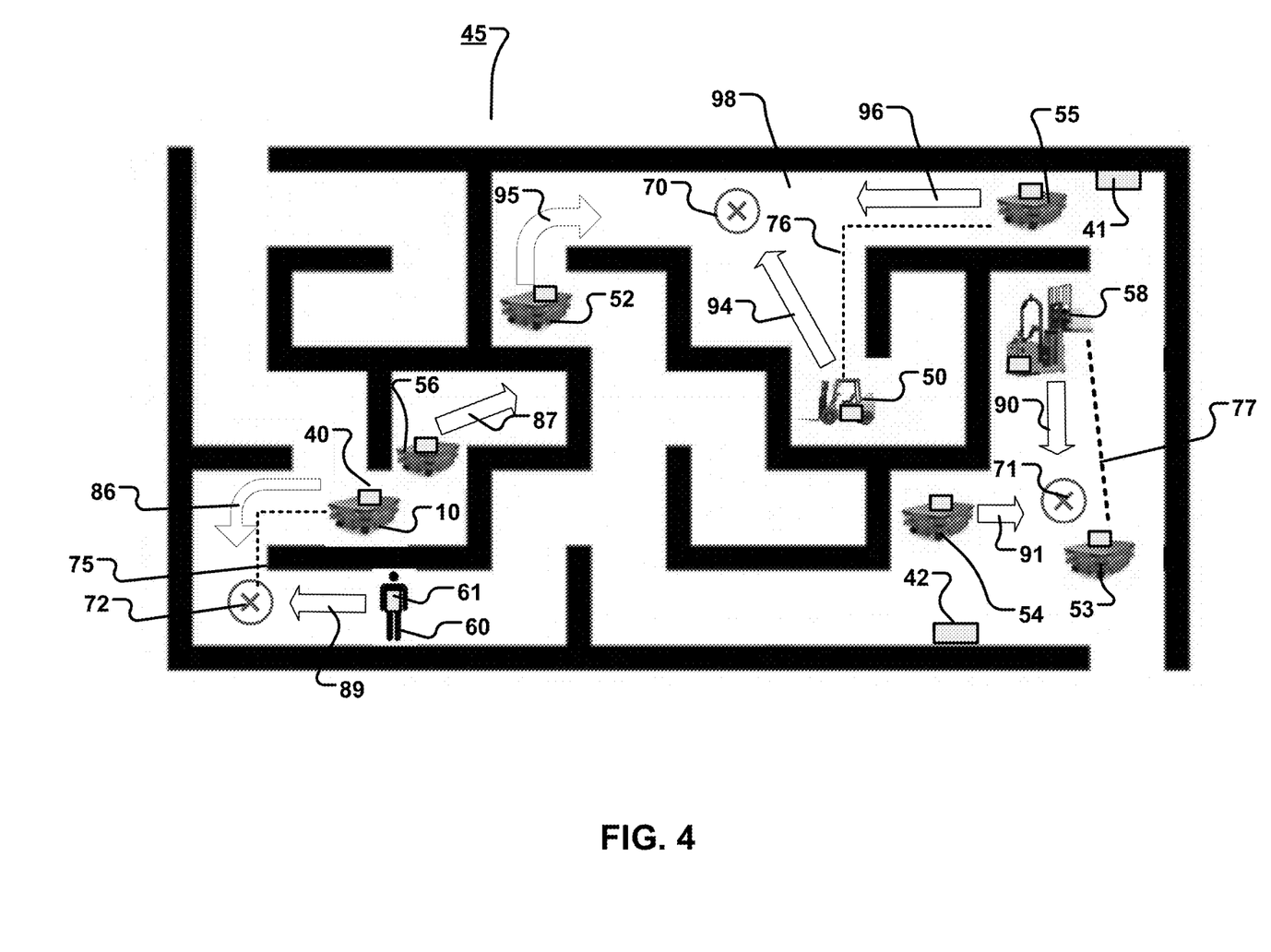
FIG. 4 is a top view of space containing objects and transceivers.

Each object in the space, including robot 10, may be part of, and be detectable by, a triangulation system within the space. The triangulation system may be part of the PSS or maintained and/or controlled within the space by the PSS. In some implementations, the triangulation system includes one or more mobile transceivers on each movable object such as robot 10 and two or more stationary transceivers at various locations in the space. For example, each inanimate movable object in space may include a transceiver. 5G routers may include the transceivers in some implementations. A transceiver on a robot is referred to as the robot transceiver and the transceivers dispersed around the space are traversed are referred to as the reference transceivers, since each such transceiver in the space constitutes a stationary reference in the space. Referring to FIG. 4, in an example, the triangulation system includes transceiver 40 on robot 10 and two reference transceivers 41 and 42 disposed at different locations within space 45 that is traversable by the robot. In this regard, each inanimate object (e.g., each robot, autonomous forklift, manually-operated forklift) in FIG. 4 also includes a transceiver and is part of the triangulation system. Although two reference transceivers are shown in FIG. 4, any appropriate number of reference transceivers may be used. For example, there may be three reference transceivers, four reference transceivers, five reference transceivers, six reference transceivers, and so forth. In some implementations, each transceiver may be configured to transmit 5G cellular signals or other types of wireless signals having low latency and high reliability. Each transceiver may also be configured to receive 5G cellular signals or whatever type of signal is output by a corresponding transmitter. Accordingly, the systems described herein are not limited to use with 5G cellular signals.

As noted, other objects within space 45 may be also be part of, and detectable by, the triangulation system. For example, space 45 may contain a manually-operated forklift 50, robots 52 to 56 having the same structure and function as robot 10, autonomous forklift 58 which is an autonomous robot having different structure than robot 10, and an animate object such as person 60. The inanimate objects within the space may include transceivers of the type described previously. The animate objects may include tags such as tag 61 that is worn and that includes circuitry configured to connect to a 5G cellular network and to operate as a signal reflector or a signal repeater. For example, 5G signals may be output from transceivers 41 and 42 and reflected from or repeated by tag 61. The reflected or repeated signal may contain an identifier that is unique to tag 61 and that allows the PSS to identify the wearer. In some implementations, the inanimate objects described herein such as robot 10 may each include such a tag in addition to, or instead of, a transceiver.

In an example operation of the triangulation system, reference transceivers 41 and 42 each output an initial 5G cellular signal into the space. The transceivers on inanimate objects receive and identify the initial 5G cellular signals and, in reply, output a 5G-comparable response signals, which each may include an identifier such as an alphanumeric code that is unique to each object. The identifier may be used by each reference transceiver 41, 42 or the PSS to identify the object that transmitted the response signal in response to an initial signal. The initial signals and the response signals may also include timestamps. The PSS may use the times that the initial signals were transmitted and the times that the response signals were received from the robot to determine the location of the robot relative to the reference transceivers. These times may be determined by the timestamps or, in the case of the initial signals, their transmission times may be stored in memory. For example, knowing the time that a signal was transmitted and a response received, and that the signals travel at the speed of light, the PSS can determine the distance between the robot and the transceiver that output the initial signal. The location of the robot can be determined using the distances between the robot and each reference transceiver that output an initial signals. Since the locations of the reference transceivers are known beforehand, by determining the distance between an object such as a robot and multiple—for example, two—reference transceivers, the PSS can determine the location of the robot within the space.

In implementations that use a signal repeater or tag, the preceding principles may also apply. For example, reference transceivers 41 and 42 each output an initial 5G cellular signal to the space. The reflector or repeater on person 60 in this example reflects the initial signals or repeats the initial signals. The PSS uses the times that the initial signals were transmitted and the times that the reflected or repeated signals were received from person 60 to determine the location of person 60 relative to the reference transceivers. These times may be determined by the time differences between when the initial signals were transmitted and the response or repeated signals were received. In this regard, the reference transceivers 41 and 42 may be able to identify the reflected or repeated signal based on unique data contained in the initial signals and the reflected or repeated signals. As above, knowing the time that a signal was transmitted and a response received, and that the signals travel at the speed of light, the PSS can determine the distance between person 60 and the transceiver that output the initial signal. The location of person 60 can be determined using the distances between person 60 and the reference transceivers that output the initial signals. Since the locations of the reference transceivers are known beforehand, by determining the distance between person 60 and multiple—for example, two—reference transceivers, the PSS can also determine the location of person 60 within the space. The identity of the object may be determined by an identifier added to the repeated or reflected signal by the tag or by circuitry included on, or associated with, the object. In another example, an attribute of the repeated or reflected signal such as frequency or amplitude may be modified in a manner that is unique to the tag associated with person 60. By knowing which tags modify which attribute(s), the PSS can identify the tag that sent a reflected or repeated signal. The PSS maintains a database associating object to tags and, through look-up, can identify the object.

In some implementations, 5G cellular include signals having speeds that are available through the 5G technology standard for broadband cellular networks. In some implementations, 5G cellular include signals that have reliabilities and latencies that are associated with the 5G technology standard for broadband cellular networks. In some examples, 5G cellular signals in the sub-6 gigahertz range (GHz) range include signals having frequencies between 450 MHz to 6 GHz, and 5G cellular signals in the millimeter-wave (mmWave) range includes signals having frequencies between 24.250 GHz to 52.600 GHz. In some examples, the sub-6 GHZ range includes signals having frequencies between 2 GHz to 6 GHz, and the mmWave range includes signals having frequencies between 30 GHz and 300 GHz. Additionally, there may be 5G spectrum in the 5925 to 7150 MHz range and in the 64 GHz to 86 GHz range. 5G network speeds may extend, for example, from 500 megabits-per-second (mbps) to 10 gigabits-per-second (gbps); however, these numbers are examples and not limitations.

In some implementations, 5G wireless signals include any signals that enable round-trip communication between a transceiver and an object in a predefined space within or below single-digit milliseconds (e.g., 20 ms) and with 5G-type reliability. In some implementations, 5G wireless signals include any signals that enable round-trip communication between a transceiver and an object in a predefined space within or below low double-digit milliseconds (e.g., 20 ms) and with 5G-type reliability. 5G-type reliability may be defined using 5G key performance indicators (KPI) specifying ultra-reliable low latency communication (URLLC) service requirements such as that no more than $10^{-5}$ (0.001%) of 20 byte packets can fail to be delivered by 1 ms. 5G-type reliability may require about 99.999% reliability for packet delivery and 99.999% network availability over a 24 hour period. In an example, a round-trip time from signal output to receipt of a response or reflected signal may be within 1 microsecond ($\mu$s) to 20 ms with 5G-type reliability. In an example, a round-trip time from signal output to receipt of response or reflected signal may be within 1 $\mu$s to 20 ms with 5G-type reliability.

In some implementations, space 45 may include a proprietary 5G wireless network configured to transmit 5G wireless signals such as those described above or greater. In some implementations, a public 5G cellular network may be used within space 45. Additional security features such as encryption may be added to implementations that employ a public 5G cellular network.

Control system 40 (FIG. 1) may include circuitry and/or an on-board computing system 34 to control operations of the robot. The circuitry or on-board computing system is "on-board" in the sense that it is located on the robot itself. The control system may include, for example, one or more microcontrollers, one or more microprocessors, programmable logic such as a field-programmable gate array (FPGA), one or more application-specific integrated circuits (ASICs), solid state circuitry, or any appropriate combination of two or more of these types of processing devices. In some implementations, on-board components of the control system may communicate with a remote computing system 39. This computing system is remote in the sense that it is not located on the robot itself. For example, the control system can also include computing resources distributed to a remote—for example, a centralized or cloud—service, at least a portion of which is not on-board the robot. Commands provide by the remote computing system may be transferred for execution by an on-board computing system. In some implementations, the control system includes only on-board components. In some implementations, the control system includes a combination of on-board components and the remote computing system. In some implementations, the control system may be configured—for example programmed—to implement control functions and robot movement absent either local or remote input from a user. In some implementations, the control system may be configured to implement control functions, including localization, based at least in part on input from a user.

The remote control system may include a fleet management system, which may be independent of, but in communication with, the PSS described herein. The fleet management system may include one or more computing devices that operate together to control, to influence, or to instruct multiple robots and/or other objects within space 45. For example, the fleet management system may be configured to coordinate operations of multiple robots, including instructing movement of a robot to a point within the space and to perform operations at that point. In some implementations, the fleet management system may store, maintain, and update a map of the space in which the robot or robots are to operate. The map may be accessed by each robot through the fleet management system or the map may be downloaded periodically, intermittently, or sporadically to all or some robots operating in the space. In some implementations, the PSS may be included as part of the fleet management system.

The control system, including the remote portions thereof, may be distributed among multiple robots operating in the space. For example, one of the robots may receive the map—for example, from a fleet controller—and distribute the map to robots operating locally within the space. Similarly, one or more robots within the space may send command and control signals to other robots.

In some implementations, the control system may be predominantly remote from the robot, with the on-board components of the control system including limited processing capabilities. In some examples, the on-board components of the robot's control system may be configured to receive inputs from the remote components of the control system and to control the robot to react to the those inputs. Processing such as determining risk level may be performed in the remote components of the control system, for example in the PSS. Due to the speed and reliability of 5G cellular signals, in some implementation the robots may need only enough processing capability to interpret received 5G commands and to execute those commands. For example, a robot may contain a microcontroller to perform these functions. Reducing the on-board processing requirements may have the effect of reducing the robot's size and weight.

Example processes are described below to identify locations of movable objects including an autonomous device in a space absent line-of-sight between the objects, to determine distances based on locations of the objects in the space, and to output information, such as risk levels, to the objects based on the locations.

In some example processes, the PSS monitors a location of each traffic participant within a space such as space 45, including animate object such as people, autonomous devices such as robots, self-driving vehicles, and manually-operated vehicles. The traffic participants are equipped with communication mechanisms such as the transceivers and/or tags described above, which connect with a low latency—for example, 5G—network system, which are used to determine the location of each traffic participant in the space. The PSS is configured to determine distances between traffic participants, to determine a risk level based on the determined distances, and to output individual risk levels to each traffic participant, for example, over a 5G cellular network. Each traffic participant is also equipped with a mechanism for receiving and storing its allocated risk level and a mechanism to activate risk mitigation functions adequate to the participant's current risk level and to the type of the traffic participant.

In some implementations, the PSS can react quickly to an imminent collision, without overreacting and without involving the fleet management system. For example, the PSS monitors, over a 5G cellular network, locations of all moving objects in space 45 using, for example, the triangulation system described herein. The Cartesian XY coordinates of all moving objects are updated in short intervals, such as in single digit milliseconds or less than 20 ms. This enables the PSS to determine the distance between pairs of moving objects. In an example, in systems where all corridors are parallel or at 90° angles, the drivable distance between two objects is determined taking into account walls or other obstacles that constrain the objects' movement. In an example, in systems where the objects' direction of travel is not constrained, the system determines the shortest distance between two objects is calculated.

The PSS is configured to output different levels of warning signals to movable objects. In an example, the PSS is configured as follows. A 5G/NR (new radio) network is connected to a fleet of robots and other movable objects in a space. In this regard, 5G NR is a radio access technology developed by 3GPP for the 5G cellular network. It was is standard for the air interface of 5G networks. Robot planning, navigation, and other robot operating system based processes are implemented by the fleet management system. A safety system, I/O (input/output) control, battery management, motor control, brake control. and audible/visual signals are implemented on the robot. In an example, localization accuracy of 30 centimeters (cm) is sufficient for system safety, when combined with safety systems on the robots.

Prior to monitoring, in this example the PSS defines collision risk levels based on the distances between individual objects in a space. In this example, the risk level is not necessarily dependent on the direction of travel of the robots; for example, the risk level may be independent of the direction of travel. Example risk levels based on distances between two movable objects may be defined by the PSS as follows.

TABLE 1

| Risk Level | Distance Between Two Movable Objects |
| --- | --- |
| 1 | >4 meters (m) |
| 2 | >3 m and ≤4 m |
| 3 | >2 m and ≤3 m |
| 4 | ≤2 m |

Fewer or greater numbers of risk levels than those shown in Table 1 may be used. In addition, different distances may correspond to different risk levels. The PSS may broadcast the definitions of risk levels to objects, such as autonomous devices, in space 45 that are capable of receiving the risk levels. Individual robots, therefore, can determine the risk levels based, at least in part, on distances output by the PSS.

In some implementations, the PSS may constantly, periodically, or intermittently monitor distances between objects and determine a collision risk level for each object relative to other objects in the space. According to some implementations, if any supervised movable object is more than a defined safe distance (for example >4 m) away from any other supervised movable object, each affected movable object receives a risk level 1 signal. Risk level 1 allows the movable object—for example, an autonomous robot, a manually-operated vehicle, or a person walking—to move freely at any normally desired and normally allowed speed. According to some implementations, if one movable object is within a first distance interval—for example ≤4 m and >3 m—of any other movable object, each affected movable object receives a risk level 2 signal. Risk level 2 causes each affected movable object to set a first maximum speed, such as 3 meters-per-second (m/s). According to some implementations, if one movable object is within a second distance interval—for example ≤3 m and >2 m—of any other movable object, each affected movable object receives risk level 3 signal. Risk level 3 causes each affected movable object to set a second maximum speed such as 2 m/s. According to some implementations, if one movable object is closer than a defined high-risk distance—for example—≤2 m—to any other movable object, each affected movable object receives a risk level 4 signal. Risk level 4 signal causes each affected movable object to set a very low maximum movable speed such as 0.3 m/s.

The risk levels of each object may be updated continuously, periodically or intermittently. Continuous, in some implementations, includes operations that occur as quickly and/or as frequently as is permitted given any hardware, software, and/or network limitations. For example, the risk levels may be updated every ten milliseconds (10 ms) or at shorter intervals. The objects such as autonomous devices in space 45 are configured to take courses of action based on the updated risk levels. For example, the PSS or other part of the control system may determine new locations of movable objects in the space. In response, the PSS determines updated distances between those object and updated risk levels therefor. The risk levels may be sent to the objects using 5G cellular network communications as described herein. The updated risk level signals cause the objects either to keep their present risk level or step-up or step-down in risk level and associated maximum speed. This way, the maximum speed can be periodically, intermittently or continuously adjusted based on a distance calculation. Thus, relatively high normal speeds can be allowed in some instances without compromising the safety of the involved moving objects.

In some implementations, the risk levels may be determined based on a combination of factors. For example, risk levels may be adjusted based on additional factors such as absolute speed of one or more objects or approach speed, which is the relative speed, e.g. how fast two objects approaching or distancing relative to each other or a projected collision point. For example, the approach speed may be obtained by comparing the time and location differences between two consecutive locations of an object. In an example, risk levels may be adjusted as follows.

Approach Speed=+4 m/s→Risk level adjustment=+2

Approach Speed=+3 m/s→Risk level adjustment=+1.5

Approach Speed=+2 m/s→Risk level adjustment=+1

Approach Speed=+1 m/s→Risk level adjustment=+0.5

Approach Speed=+0 m/s→Risk level adjustment=0

Approach Speed=−1 m/s→Risk level adjustment=−0.5, where a negative approach means that the distance is increasing.

In an example, the system registers two objects that are separated by a distance of 3.5 m. According to Table 1, this would result in a risk level of 2. At the same time, it is determined that the objects are moving towards each other at a speed of +2 m/s, which according to the preceding definitions would lead to a risk level adjustment +1 so that the resulting risk level would be 3. In implementations such as these, the system does not wait to perform speed adjustments until a new distance threshold is reached but can start performing speed adjustments before new distance threshold is reached based on the relative speed between the objects.

In some cases, the impact of a possible collision and/or the impact of a sudden deceleration is greater if the speed of at least one of the objects is relatively high. The speed of each movable object may be obtained by identifying two consecutive locations of an object and the time it took to move between those two locations. An additional risk factor may include the absolute speed of at least one of the moving objects. In an example, risk levels may be adjusted as follows.

Actual Speed=+4 m/s→Risk level adjustment=+2

Actual Speed=+3 m/s→Risk level adjustment=+1.5

Actual Speed=+2 m/s→Risk level adjustment=+1

Actual Speed=+1 m/s→Risk level adjustment=+0.5

Actual Speed=+0 m/s→Risk level adjustment=0

In some implementations, a risk level may initiate risk mitigating actions other than changes in speed. For example, a risk level could trigger an alarm such as a light, sound, or vibration in order to warn a driver of a manually-operated vehicle, such as a forklift, that it is in the vicinity of another object and in danger of collision. For example, a risk level could trigger an alarm such as a light, sound, or vibration in order to warn a person walking in a space that the person is in the vicinity of another object and in danger of collision. The alarm may be output by a tag on the person or vehicle or using the vehicle's on-board systems. In an example, a risk level could trigger a device, such as a robot, to change both its speed and direction of movement. In an example, the robot may plan a new route in order to avoid a collision with an approaching object.

A distance between two objects may be determined based on a shortest physical distance between the two objects, as noted. A distance associated with two objects may be determined based on a shortest distance to a nearest predefined point, such as an intersection. For example, if all travel in a space is restricted to parallel and right angle lanes, so that there is a particular risk of collision in an intersection, the distance to the nearest intersection may be used as the input for determining the risk level. In an example, two objects may approach the same intersection but be unable to see either other. The PSS may control the risk levels, and thus the speeds, of those objects based on their proximities to the intersection. In some implementations, each device may receive the same risk level and thus control its speed in the same manner. As noted previously other attributes may affect how a device control its speed, examples of which included a size of the device, a weight of the device, a maximum speed of the device, braking distances of the device at different speeds, or some combination of these attributes. In some implementations, two devices may receive different risk levels based, for example, on their respective speeds and distance to the intersection.

Figure 5:
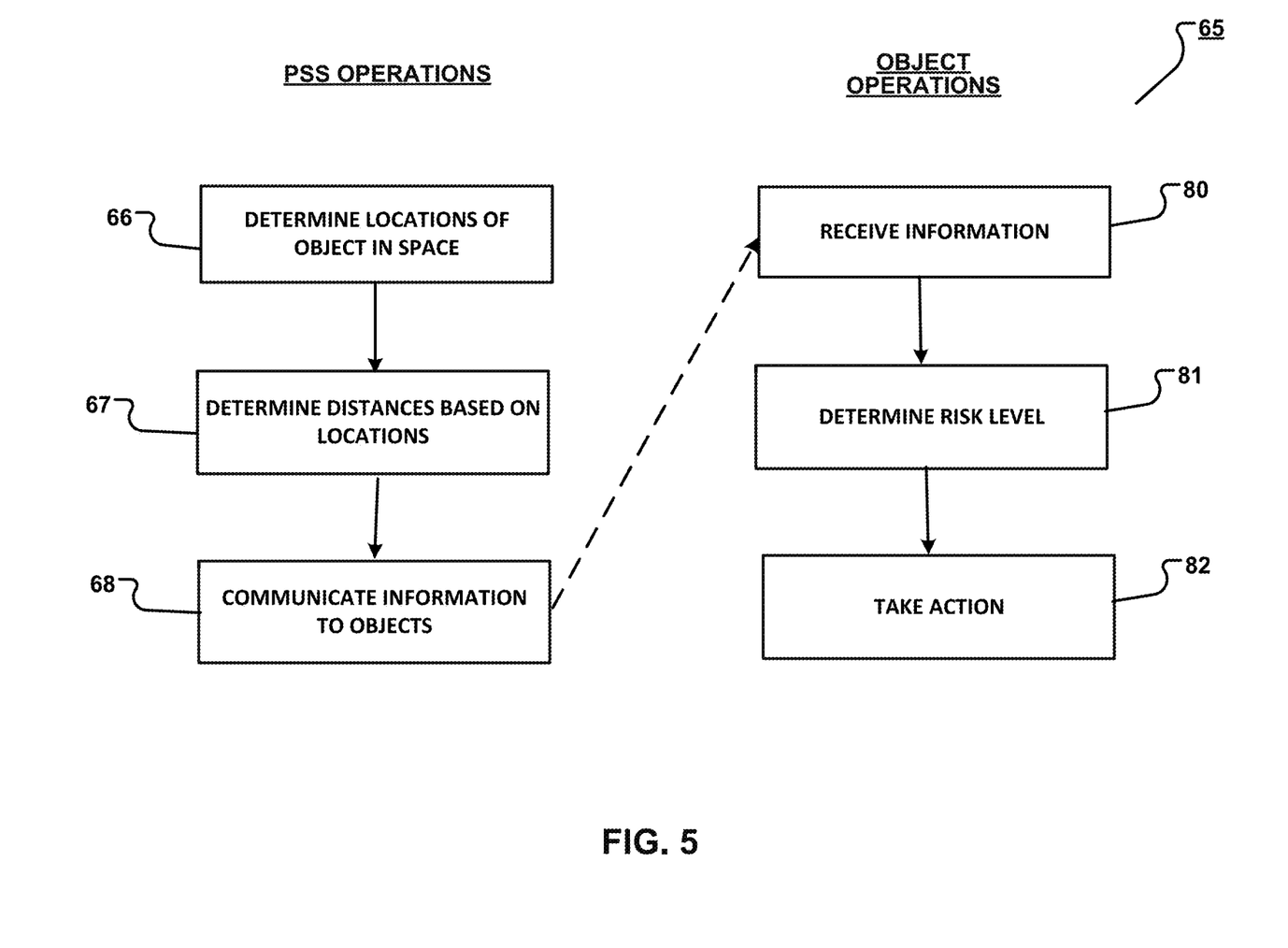
FIG. 5 is a flowchart showing operations that are part of an example process for using distances between devices to control operation of the devices.

FIG. 5 shows operations included in an example process 65 performed, at least in part, by the PSS to identify locations of movable objects including an autonomous device in a space absent the device's line-of-sight between the objects, to determine distances based on the locations of the objects in the space, and to output information, such as risk levels, to the objects based on the locations. The moveable objects then may take a course of action, such as decreasing their speed, based on the information. Process 65 and the operations associated therewith may be performed in part by the PSS, which may be part of a device's control system but independent of the fleet management system. For example, process 65 may be performed using circuitry or an on-board computing system associated with a device and using a remote computing system in communication with the circuitry or on-board computing system. In the example of FIG. 5, operations performed by the PSS are shown on the left and operations performed on an object such as a mobile robot are on shown on the right.

According to process 65, the PSS determines (66) the locations of objects within a space, such as space 45 of FIG. 4. By using an appropriate wireless network, such as a 5G cellular network, the locations of the objects in the space can be determined without requiring line-of-site to the objects. Also, using an appropriate wireless network, such as a 5G cellular network, the locations of the objects in the space can be determined without requiring the objects themselves to report their locations to the PSS. In this example, the objects include, but are not limited to, person 60, mobile robots 10, 52, 53, 54, 55, and 56, autonomous forklift 58, and manually-operated forklift 50. Autonomous forklift 58 is also a mobile robot, but of a different type than mobile robots 10 and 52 to 56 and, therefore, has been given a different name. Autonomous forklift 58, however, includes all robot systems and functions described with respect to robot 10 that enable the techniques and operations described herein. Manually-operated forklift 50 is user-driven; however, may it include a transceiver or tag to connect to a 5G cellular network, a control system, a vision system, and communication capabilities of the type described herein. Manually-operated forklift 50 may also include an alarm system to provide visual and/or audible cues to a driver under certain circumstances. Person 60 wears a tag 61 as described previously.

The PSS is configured to determine the locations of the objects in space 45 using the triangulation techniques described herein. For example, the PSS may send an initial signal over a 5G cellular network that covers space 45. Those devices that are capable of receiving the initial signal may reply with a response signal. The triangulation system described herein may determine the locations of those devices based on the initial signal and the response signals. In another example, the PSS may send a signal over a 5G cellular network that covers space 45. Tags or other circuitry on the object repeat or reflect the signal as described previously. The triangulation system described herein may determine the locations of those objects based on the output signal and the reflected or repeated signals. These operations may occur continuously, periodically, or intermittently to update the locations of objects in the space on a continuous basis. As described herein, the speed and reliability of the 5G or 5G-type communications enable rapid and reliable updates. An earlier example includes updating objects' positions every 10 ms or less; however, the processes described herein are not limited to updates at any particular numerical time interval.

In some implementations, the PSS determines (67) the distance between each object and every other object in the space based on their locations. For example, for robot 10, the PSS determines the current distance between robot 10 and each of person 60, robots 52 to 56, autonomous forklift 58, and manually-operated forklift 50. For example, for person 60, the PSS determines the current distance between person 60 and each of mobile robots 10 and 52 to 56, autonomous forklift 58, and manually-operated forklift 50. In some implementations, the PSS determines the distance between each object and one or more predefined locations in space 45, such as intersections 70, 71, and 72. For example, the PSS may determine the current distance between each robot 10 and 52 to 56 and each of intersections 70 to 72, the distance between manually-operated forklift 50 and each of intersections 70 to 72, and so forth. In some implementations, each distance may be determined taking driving constraints, such as walls, into account. For example, the distance between robot 10 and intersection 72 may be defined by line 75 and the distance between robot 55 and manually-operated forklift 50 may be defined by line 76. In such examples, the distance may be defined using the coordinates of the objects and a map of the space that contains obstacles that constrain driving, where the map includes coordinates of the obstacles. In cases where there are no obstacles between two objects, such as the case with autonomous forklift 58 and robot 53, the distance 77 may be determined by the difference between the coordinates of autonomous forklift 58 and robot 53.

In some implementations, the PSS determines both the distance between each object and all other objects in the space and the distance between each object each predefined location in the space, such as the intersections. Either or both of these types of distances may trigger assignment of a risk level and an associated course of action as described herein.

The PSS communicates (68) information to the objects that are based on the distances that were determined. In some implementations, the PSS outputs the distances themselves. In such implementations, a device may receive (80) a distance and determine (81) a risk level such as those of Table 1 above based on the distance. For example, the device may store in computer memory a look-up table correlating distances to risk levels, and look-up the risk level appropriate for the distance that it received from the PSS. In some implementations, the PSS determines the risk levels for each object and outputs the risk levels themselves to the objects, thereby eliminating the need for the device to perform a look-up to determine the risk level or to store a table correlating risk levels to distances. In some implementations, the PSS determines if an alarm condition has been met based on the distances and outputs a signal to a tag or a device to trigger an alarm.

In this regard, an object may receive information about various other objects in the space. For example, robot 10 may receive a risk level or distance for each of person 60, mobile robots 52 to 56, autonomous forklift 58, and manually-operated forklift 50. Autonomous forklift 58 may receive a risk level or distance for each of person 60, mobile robots 10 and 52 to 56, and manually-operated forklift 50. One or more of those risk levels or distances may cause the object to take or implement (82) a course of action. In some implementations, if more than one risk level or distance triggers a course of action, the most conservative course of action will be followed. For example, if the distance between moving robot 54 and stationary robot 53 warrants a risk level of 3 and the distance between moving robot 54 and moving autonomous forklift 58 warrants a risk level of 2, then the robot will take the course of action associated with risk level 3, the more conservative approach. For example, if the distance between robots 10 and 56 warrants a risk level of 4 and the distance between robot 10 and intersection 72 warrants a risk level of 2, then the robot will take the course of action associated with risk level 4, the more conservative approach. Conservative in this context includes the safer option among two options, such as the option that results in the slower or slowest speed appropriate for the object.

In some implementation, an object's course of action is independent of its direction of travel. For example, if the distance between robots 10 and 56 warrants a risk level 4, then the course of action that both robots will take is to slow to a speed associated with risk level 4 even though robot 10 is traveling in direction 86 and robot 56 is traveling in direction 87. In some implementations, direction of travel may be used to determine the risk levels associated with an object. Direction of travel may be determined by the PSS, for example, based on a succession of prior object positions showing a trend of movement in a particular direction.

In the example of FIG. 4, robot 10 is traveling in the direction of arrow 86 and person 60 is walking in the direction of arrow 89. The vision system on robot 10 cannot see person 60 due to the wall between them. If both continue on their trajectory at current speeds, a collision will occur at intersection 72. Accordingly, the PSS determines the distance between the two or the distance of each of these objects to intersection 72. The PSS outputs the distance or a risk level to robot 10 and to the tag 61 on person 60. In the case of the robot, the risk level associated with the distance causes robot 10 to slow to speed associated with the risk level. For example, if it is risk level 3, the robot may be controlled—either by its on-board control system, the remote control system, or a combination of the two—to slow from a speed of 4 m/s to 2 m/s. The tag 61 on the person may receive the information from the PSS and trigger an alarm. For example, a yellow light may mean caution, an orange light may mean danger, and a red light may mean a collision is imminent. In this example, a green light may mean all is clear. In this example, the person may react accordingly by stopping, changing course, or the like.

In the example of FIG. 4, autonomous forklift 58 is traveling in the direction of arrow 90 and robot 54 is traveling in the direction of arrow 91. The vision system on robot 54 cannot see autonomous forklift 58 and the vision system on autonomous forklift 58 cannot see robot 54 due to the wall between them. If both continue on their trajectory at current speeds, a collision will occur at intersection 71. Accordingly, the PSS determines the distance between the two or the distance of each of these objects to intersection 71. The PSS outputs the distance or a risk level to robot 54 and to autonomous forklift 58. In the case of the robot, the risk level associated with the distance causes robot 54 to slow to a speed associated with the risk level. For example, if it is risk level 3, the robot may be controlled—either by its on-board control system, the remote control system, or a combination of the two—to slow from a speed of 6 m/s to 4 m/s. In the case of the autonomous forklift, risk level 3 causes the autonomous forklift to slow from a speed of 5 m/s to 1 m/s. The differences in speed reduction at the same risk level may be due to differences in attributes of the respective objects. For example, differences in one or more of a size of each object, a weight of each object, a maximum speed of each object may, and/or a braking distances of each object may dictate the speed reductions appropriate for each risk levels. Information stored on the on-board or the remote robot control system may be used to determine the speed reduction appropriate for each type of object. For example, each robot may include a table specific to that robot that correlates risk level to speed.

In the example of FIG. 4, manually-operated forklift 50 is traveling in the direction of arrow 94, robot 52 is traveling in the direction of arrow 95, and robot 55 is traveling in the direction of arrow 96. These objects cannot see each other due to the presence of walls between them. If all three continue on their trajectory at current speeds, a collision of two or more of them will occur at intersection 70. Accordingly, the PSS determines the distance between the three objects or the distance of each of the three objects to intersection 70. The PSS outputs the distance or a risk level to robots 52 and 55 and to manually-operated forklift 50. In the case of the robots, the risk level associated with the distances causes them to slow to their speeds. For example, if the risk level is 2 for each robot (relative to the other robot and the manually-operated forklift or the intersection), the robot may be controlled—either by its on-board control system, the remote control system, or a combination of the two—to slow from a speed of 5 m/s to 3 m/s. In the case of the manually-operated forklift, risk level 2 may cause the manually-operated forklift to trigger an alarm, which may be audible or visual. For example, a sound may increase in volume by a predefined amount for each risk level. For example, a light may increase in brightness by a predefined amount or change in color for each risk level. In cases where there are many risk levels—for example, ten or more—the increase in sound volume or light brightness may appear continuous to the driver of the manually-operated forklift. The driver may react by changing course and/or a speed of the manually-operated forklift. In this regard, drivers are located high-up in some vehicles and may not notice small robots. The alarm and/or control described herein may assist them in operating their vehicles. In some implementations, the manually-operated forklift includes an on-board control system, on-board components that are instructed by a remote control system, and/or an on-board vision system, examples of which are described herein. The control system, whether on-board, remote, or a combination of the two, may be programmed to take control over the manually-operated forklift or to prevent certain operations of the manually-operated forklift in cases where the risk level exceeds a predefined level. Under these circumstances, the manually-operated forklift becomes autonomous device.

In the examples above, the PSS updates the locations of the objects in the space and, as described, updates the distances and/or risk levels frequently. The objects may then adjust their course of action based on the new values. In some implementations, when the vision systems of an object such as robot 52 is capable of seeing an object such as robot 55 (for example, when both are facing each other in hallway 98), collision avoidance based on machine-vision in one or both of the robots may take over from the PSS and, for example, control travel of robot 52 so as to avoid collision with robot 55. For example, one or both robots may change their trajectory. In the case where two robots are near each other but traveling in different directions, such as robots 10 and 56, their speeds may increase as their locations are updated. That is, the new locations indicate that they are farther apart. As such, their risk levels may decrease, which may correspond to increases in speed of movement.

In some implementation, the PSS is configured to identify when a location of an object is no longer identifiable. For example, an object that is previously known to be in a space disappears from the perspective of the PSS (that is, the object's location is no longer detected by the PSS). In cases such as this, the PSS may communicate information to all objects in the space or to objects within a predefined distance of the last known location of the object that has disappeared. The information may be a predefined risk level, such as a greatest level of risk (e.g., risk level 4) among the risk levels. The information may instruct the objects to slow to a risk level 4 speed or less, or to stop until the situation can be resolved. Resolution may include the PSS detecting the missing robot or manual inspection to determine the status of the robot. In some implementations, a robot may be controlled to move slowly towards the last known location and that robot's vision system may view the robot and send information about the robot to the control system or the fleet management system. One or both of these systems may determine the status of the missing robot based on that information.

In some implementations, communications involving the 5G cellular network may reduce or eliminate the need for at least part of on-board vision systems. In such implementations, all or part of the vision system functionality may be performed using 5G cellular communications between the control system and devices in the space.

As explained previously, the robots include line-of-sight sensor(s) for navigation and for safety. These sensors continuously determine the distance between objects, including movable objects, and space infrastructure. Each robot may have a dedicated safety zone which is a distance from a perimeter of the robot, and which, in some examples, may be measured in double-digit centimeters. When an object enters that safety zone, the robot is controlled to stop. However, in some cases, the robot is required to enter a passage that is more narrow than its designated safety zone. The control system may use a risk level determined as described herein to reduce the safety zone around the robot to allow it to traverse tight spaces. For example, the robot's safety zone may be reduced from 60 centimeters (cm) from any point on the robot to 30 cm from any point on the robot or from 60 centimeters (cm) in the robot's direction of travel to 30 cm in the robot's direction of travel.

In an example, a robot detects an object within its safety zone. In response, the robot is stopped in accordance with its existing safety protocols. If the robot's risk level as determined herein is less than a predefined threshold, which indicates that there are no moving objects in the vicinity of the robot, the safety zone for the robot is reduced to a predefined level. This would enable the robot to move through narrow passages that it would otherwise be unable to pass through due to its safety zone.

In some implementations, a robot's safety zone could be adjusted dynamically based on its current risk level as determined herein. That is, as the robot's risk level changes, so does the scope of its safety zone. For example, at a greater risk level, the robot's safety zone may be 30 cm, at a lower risk level, the robot's safety zone may be 60 cm, and at a minimum risk level the robot's safety zone may be 90 cm.

The example implementations described herein focus on devices such as robots and forklifts in an indoor setting. However, the ubiquity of 5G cellular networks make the techniques described herein applicable to self-driving automobiles in a public setting. For example, self-driving cars or self-driving trucks may be controlled during operation on highways or other roads using the techniques described herein.

In some implementations, the autonomous vehicles may be or include flight-capable drones. In this case, the space that the drones are capable of traversing includes air space though which the drones may fly. The limits of the air space may be defined using appropriate public or private flight maps.

The example devices described herein may include, and the processes described herein may be implemented using, a control system comprised of one or more computer systems comprising hardware or a combination of hardware and software. For example, a device may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example devices described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the devices can be performed by one or more programmable processors executing one or more computer programs to perform the functions described herein. At least part of the devices can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

In the description and claims, the adjectives "first", "second", and "third" do not designate priority or order. Unless otherwise indicated explicitly or by context, these adjectives are used solely to differentiate the elements that they modify.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
a positioning surveillance system (PSS) to identify locations of objects that are movable throughout a space, the PSS being configured to identify the locations without requiring a line-of-sight between the objects;
a control system to determine distances based on the locations of the objects in the space and to communicate information to an autonomous vehicle comprising one of the objects that is based on at least one of the distances, the information being communicated to the autonomous vehicle in 20 milliseconds (ms) or less, the information corresponding to a risk level, the risk level being based on a risk of collision of the autonomous vehicle with a first object among the objects; and
the autonomous vehicle, the autonomous vehicle comprising a transceiver to receive the information, the autonomous vehicle being configured to control a speed of travel of the autonomous vehicle based on the risk level when the autonomous vehicle is not within a line-of-sight of the first object, the autonomous vehicle comprising a vision system composing one or more sensors, and the autonomous vehicle being configured to control the speed of travel based on information from the one or more sensors when the autonomous vehicle is within the line-of-sight of the first object.

2. The system of claim 1, wherein the PSS comprises at least two transceivers arranged throughout the space, each of the transceivers being configured to determine location information for each of the objects; and
wherein the PSS is configured to identify the locations of the objects using a triangulation process based on the location information from the at least two transceivers.

3. The system of claim 2, wherein the PSS comprises at least one transceiver on at least one of the objects.

4. The system of claim 1, wherein objects other than the autonomous vehicle are associated with tags; and
wherein the PSS is configured to output signals to the tags and to identify locations of the objects based on a triangulation process using reflections of signals from the tags.

5. The system of claim 4, wherein a round-trip time from signal output to receipt of tag signal reflection is within a range of 1 microsecond (µs) to 20 milliseconds (ms).

6. The system of claim 4, wherein the signals are output at speeds that are available through the fifth generation (5G) technology standard for broadband cellular networks.

7. The system of claim 4, wherein the signals have reliabilities and latencies that are associated with the fifth generation (5G) technology standard for broadband cellular networks.

8. The system of claim 1, wherein at least part of the PSS is stationary within the space.

9. The system of claim 1, wherein the distances comprises a distance between the autonomous vehicle and the first object.

10. The system of claim 1, wherein the distances comprise a distance between the autonomous vehicle and a specified point in the space.

11. The system of claim 1, wherein the information comprises a distance from the autonomous vehicle to the first object.

12. The system of claim 1, wherein the risk level comprises one of predefined risk levels.

13. The system of claim 12, wherein risk levels that represent greater risks correspond to shorter distances between objects.

14. The system of claim 1, wherein the information is first information;
- wherein the PSS is configured to identify when a location of an object is no longer identifiable; and
- wherein the control system is configured to communicate second information to at least some of the objects based on the location of the object no longer being identifiable.

15. The system of claim 14, wherein risk levels are based on the first information, where a risk level corresponds to a risk of collision between at least two of the objects, and where risk levels that represent greater risks correspond to shorter distances between objects and risk levels that represent less risk correspond to longer distances between objects; and
- wherein the second information corresponds to a greatest level of risk among the risk levels.

16. The system of claim 1, wherein one or more of the objects other than the autonomous vehicle comprise one or more of manually-operated vehicles or living beings.

17. The system of claim 1, wherein the PSS is configured to identify the locations periodically or intermittently; and
- wherein the control system is configured to determine the distances periodically or intermittently and to communicate the information to the autonomous vehicle periodically or intermittently.

18. The system of claim 1, wherein the risk level is based on an absolute speed of the first object.

19. The system of claim 1, wherein the risk level is based on an approach speed, the approach speed comprising a relative speed between the first object and the autonomous vehicle.

20. The system of claim 1, wherein the PSS and the control system are parts of a same computing system comprised of one or more processing devices and memory storing instructions that are executable by the one or more processing devices.

21. The system of claim 1, wherein the PSS and the control system are implemented on separate computing systems, each separate computing system comprising one or more processing devices and memory storing instructions that are executable by the one or more processing devices.

22. The system of claim 1, wherein the control system comprises one or more processing devices and memory storing instructions that are executable by the one or more processing devices; and
- wherein part of the control system is on the autonomous device.

23. A system comprising:
- a centralized system configured to manage autonomous vehicles that are operable within a space, the centralized system being configured to identify locations of objects including an autonomous vehicle among the autonomous vehicles in the space absent a line-of-sight between the objects in the space and to output information to the autonomous vehicle based on two or more of the locations; and
- the autonomous vehicle comprising an on-board computing system to implement a course of action based on the information;
- wherein:
  - the information corresponds to a risk level that is based, at least in part, on a location of the autonomous vehicle and a first object of the objects,
  - the risk level is based on a risk of collision of the autonomous vehicle with the first object among the objects,
  - the course of action comprises the autonomous vehicle changing a speed of travel of the autonomous vehicle based on the risk level when the autonomous vehicle is not within a line-of-sight of the first object; and
- wherein the autonomous vehicle comprises a vision system comprising one or more sensors, and the autonomous vehicle is configured to change the speed of travel based on information from the one or more sensors when the autonomous vehicle is within the line-of-sight of the first object.

24. The system of claim 23, wherein the on-board computing system is configured to implement the course of action based also on attributes of the autonomous vehicle.

25. The system of claim 24, wherein the attributes comprise at least one of a size of the autonomous vehicle, a weight of the autonomous vehicle, a maximum speed of the autonomous vehicle, or braking distances of the autonomous vehicle at different speeds.

26. The system of claim 24, wherein the course of action comprises changing a direction of travel of the autonomous vehicle.

27. The system of claim 23, wherein the information comprises distances between the objects or between the objects and a predefined location in the space that are based on the locations.

28. The system of claim 23, wherein the risk level is based on a distance between the autonomous vehicle and the first object or between both the autonomous vehicle and the first object and a predefined location in the space.

29. The system of claim 28, wherein the on-board computing system is configured to generate a warning based on the risk level, the warning being at least one of audible or visual.

30. The system of claim 28, wherein the course of action comprises reducing the speed of travel of the autonomous vehicle to a slowest speed of travel among speeds of travel associated with the risk level.

31. The system of claim 28, wherein the risk level changes to represent less risk of collision of the autonomous vehicle and the first object, and wherein the course of action comprises increasing or maintaining a speed of travel of the autonomous vehicle based on the change to the risk level.

32. The system of claim 28, wherein the risk level changes to represent less risk of collision of the autonomous vehicle and the first object, and wherein the course of action comprises reducing a size of a safety zone associated with the autonomous device based on the change to the risk level.

33. The system of claim 23, wherein the risk level comprises one of predefined risk levels.

34. The system of claim 23, wherein each of the objects including the autonomous vehicle has a tag that is indicative of presence in the space; and
- wherein, in a case that the centralized system is unable to establish the presence of an object in the space using the tag, the course of action comprises decreasing speed of the autonomous vehicle, stopping the autonomous vehicle, or acting on a warning.

35. The system of claim 23, wherein the centralized system comprises at least two static transceivers arranged in the space, each of the at least two static transceivers being configured to determine location information for each of the objects including the autonomous vehicle; and
- wherein the centralized system is configured to identify the locations of the objects using a triangulation process based on the location information from the at least two static transceivers.

36. The system of claim 35, wherein the centralized system comprises at least one transceiver on at least one autonomous vehicle in the space other than the autonomous vehicle comprising the on-board computing system.

37. The system of claim 35, wherein each of the objects including the autonomous vehicle is associated with a tag; and
   wherein the centralized system is configured to output signals to the tags and to identify the locations based on a triangulation process using reflections of signals from the tags.

38. The system of claim 37, wherein a round-trip time from signal output to receipt of tag signal reflection is within a range of 1 microsecond (μs) to 1 millisecond (ms).

39. The system of claim 37, wherein a round-trip time from signal output to receipt of tag signal reflection is within a range of 1 microsecond (μs) to 20 milliseconds (ms).

40. The system of claim 37, wherein the signals are output at speeds that are available through the fifth generation (5G) technology standard for broadband cellular networks.

41. The system of claim 37, wherein the signals have reliabilities and latencies that are associated with the fifth generation (5G) technology standard for broadband cellular networks.

42. The system of claim 23, wherein the autonomous vehicle comprises a flight-capable drone; and
   wherein the space includes air space.

* * * * *